United States Patent
Yin et al.

(10) Patent No.: US 10,708,398 B2
(45) Date of Patent: *Jul. 7, 2020

(54) TERMINAL DEVICE

(71) Applicant: Huawei Technologies Co., Ltd., Shenzhen (CN)

(72) Inventors: Bangshi Yin, Beijing (CN); Ruifeng Li, Beijing (CN); Jianhong Luo, Beijing (CN); Xiulan Liu, Beijing (CN); Yan Wang, Beijing (CN); Jiuliang Gao, Beijing (CN); Fan Yang, Beijing (CN); Tao Wang, Xi'an (CN); Hui Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,447

(22) Filed: Mar. 13, 2019

(65) Prior Publication Data

US 2019/0215389 A1    Jul. 11, 2019

Related U.S. Application Data

(63) Continuation of application No. 15/328,134, filed as application No. PCT/CN2014/082828 on Jul. 23, 2014, now Pat. No. 10,284,697.

(51) Int. Cl.
*G03B 19/00* (2006.01)
*H04M 1/02* (2006.01)
(Continued)

(52) U.S. Cl.
CPC ........ *H04M 1/0264* (2013.01); *G06F 1/1686* (2013.01); *H04M 1/02* (2013.01);
(Continued)

(58) Field of Classification Search
CPC ..................................................... G03B 19/00
See application file for complete search history.

(56) References Cited

U.S. PATENT DOCUMENTS

| 5,801,919 A | 9/1998 | Griencewic |
| 6,532,035 B1 | 3/2003 | Saari et al. |

(Continued)

FOREIGN PATENT DOCUMENTS

| CN | 1720712 A | 1/2006 |
| CN | 1725775 A | 1/2006 |

(Continued)

OTHER PUBLICATIONS

Machine Translation and Abstract of Chinese Publication No. CN2807637, Aug. 16, 2006, 6 pages.
(Continued)

*Primary Examiner* — Cindy Trandai
(74) *Attorney, Agent, or Firm* — Conley Rose, P.C.

(57) ABSTRACT

A terminal device includes a screen, a first camera, and a movement mechanism. The first camera is disposed on a movable component of the movement mechanism, the movement mechanism is disposed on the back of the screen, and the movable component is configured to drive the first camera to move from the back of the screen to a position at which the first camera can be seen from in front of the terminal device.

20 Claims, 10 Drawing Sheets

(51) Int. Cl.
*H04W 88/02* (2009.01)
*G06F 1/16* (2006.01)

(52) U.S. Cl.
CPC .......... *H04W 88/02* (2013.01); *H04M 1/0225* (2013.01); *H04M 1/0235* (2013.01); *H04M 2250/20* (2013.01)

(56) References Cited

U.S. PATENT DOCUMENTS

| | | | |
|---|---|---|---|
| 6,812,958 | B1 | 11/2004 | Silvester |
| 6,898,301 | B2 | 5/2005 | Iwanaga |
| 7,435,018 | B2 | 10/2008 | Huang et al. |
| 7,800,648 | B2 | 9/2010 | Lu et al. |
| 8,054,379 | B2 | 11/2011 | Yuan |
| 8,421,913 | B2 | 4/2013 | Kim et al. |
| 8,890,944 | B1 | 11/2014 | Reynolds |
| 9,332,176 | B2 | 5/2016 | Jang et al. |
| 9,762,780 | B2 | 9/2017 | Jung et al. |
| 9,769,390 | B2 | 9/2017 | Pylkkanen |
| 2002/0044216 | A1 | 4/2002 | Cha |
| 2003/0181225 | A1 | 9/2003 | Hasegawa et al. |
| 2003/0193588 | A1 | 10/2003 | Yuen et al. |
| 2004/0189851 | A1 | 9/2004 | Son et al. |
| 2005/0014527 | A1* | 1/2005 | Chambers ........... H04M 1/0264 455/556.1 |
| 2005/0168628 | A1 | 8/2005 | Wang et al. |
| 2006/0105806 | A1 | 5/2006 | Vance et al. |
| 2007/0253703 | A1 | 11/2007 | Tsai et al. |
| 2008/0064437 | A1 | 3/2008 | Chambers et al. |
| 2008/0095526 | A1* | 4/2008 | Chang .................... G03B 19/00 396/429 |
| 2009/0111515 | A1 | 4/2009 | Joo |
| 2009/0252487 | A1* | 10/2009 | Matsumoto ......... H04M 1/0237 396/448 |
| 2010/0237222 | A1 | 9/2010 | Lin |
| 2011/0117958 | A1* | 5/2011 | Kim ....................... G03B 35/10 455/556.1 |
| 2013/0163170 | A1 | 6/2013 | Chen |
| 2014/0176792 | A1 | 6/2014 | Cao |
| 2014/0364168 | A1 | 12/2014 | Galuszka |
| 2015/0065046 | A1 | 3/2015 | Wilfred et al. |
| 2015/0236743 | A1 | 8/2015 | Kennedy |
| 2015/0288880 | A1* | 10/2015 | Chen .................. H04N 5/23238 348/36 |

FOREIGN PATENT DOCUMENTS

| | | |
|---|---|---|
| CN | 2807637 Y | 8/2006 |
| CN | 2870332 Y | 2/2007 |
| CN | 101426041 A | 5/2009 |
| CN | 101841584 A | 9/2010 |
| CN | 202696688 U | 1/2013 |
| CN | 103533222 A | 1/2014 |
| CN | 103546687 A | 1/2014 |
| CN | 203523192 U | 4/2014 |
| CN | 203537435 U | 4/2014 |
| EP | 1429531 B1 | 7/2009 |

OTHER PUBLICATIONS

Machine Translation and Abstract of Chinese Publication No. CN103533222, Jan. 22, 2014, 13 pages.
Machine Translation and Abstract of Chinese Publication No. CN103546687, Jan. 29, 2014, 19 pages.
Machine Translation and Abstract of Chinese Publication No. CN2870332, Feb. 14, 2007, 13 pages.
Machine Translation and Abstract of Chinese Publication No. CN202696688, Jan. 23, 2013, 6 pages.
Machine Translation and Abstract of Chinese Publication No. CN203537435, Apr. 9, 2014, 6 pages.

* cited by examiner

TERMINAL DEVICE

CROSS-REFERENCE TO RELATED APPLICATIONS

This application is a continuation of U.S. patent application Ser. No. 15/328,134 filed on Jan. 23, 2017, which is a national stage of International Patent Application No. PCT/CN2014/082828 filed on Jul. 23, 2014, which is hereby incorporated by reference in its entirety.

TECHNICAL FIELD

The present disclosure relates to the field of display technologies, and in particular, to a terminal device.

BACKGROUND

Currently, front-facing cameras are configured on many terminal devices such as a mobile phone, a notebook computer, and a tablet computer, and are configured to shoot a photograph or a video of a target in front of the terminal devices.

For example, FIG. 1 shows a camera layout of an existing common terminal device such as a mobile phone. A rear-facing camera 101 is generally placed on the top or back of a screen 102 of the terminal device, and a front-facing camera 103 is generally placed on the top of the screen 102 of the mobile phone, so that the front-facing camera 103 can shoot a photograph or a video of a target in front of the terminal device.

However, in an existing camera layout, relatively large space needs to be reserved at the top of a terminal device to place a front-facing camera, which causes a limited ratio of a screen to the entire terminal device.

SUMMARY

Embodiments of the present disclosure provide a terminal device, to overcome a problem that a ratio of a screen to the entire terminal device is limited by a camera.

To resolve the foregoing technical problem, a technical solution used in the embodiments of the present disclosure is as follows.

The embodiments of the present disclosure provide a terminal device, including a screen, a first camera, and a movement mechanism, where the first camera is disposed on a movable component of the movement mechanism, the movement mechanism is disposed on the back of the screen, and the movable component is configured to drive the first camera to move from the back of the screen to a position at which the first camera can be seen from in front of the terminal device.

In a first possible implementation manner, the terminal device may further include a second camera, where the second camera is disposed on the back of the screen.

In a second possible implementation manner, the movable component may be further configured to drive the first camera to move from the position at which the first camera can be seen from in front of the terminal device to the back of the screen.

With reference to the first possible or second possible implementation manner, in a third possible implementation manner, the movement mechanism is a rotating mechanism, a sliding mechanism, a popup mechanism, or a transmission mechanism.

With reference to the third possible implementation manner, in a fourth possible implementation manner, the sliding mechanism includes a chute and a sliding block, where the chute is disposed on the back of the screen, and the first camera is disposed in the sliding block.

With reference to the third possible implementation manner, in a fifth possible implementation manner, the rotating mechanism includes a rotating shaft and a rotating member capable of rotating along the rotating shaft, where the rotating shaft is disposed on the back of the screen, and the first camera is disposed on the rotating member.

With reference to the first possible or second possible implementation manner, in a sixth possible implementation manner, the movement mechanism is disposed on a rear surface of the screen, or the movement mechanism is disposed on any component stacked between a rear surface of the screen and a rear cover of the terminal device, or the movement mechanism is disposed on a rear cover, located on the back of the screen, of the terminal device.

With reference to the first possible or second possible implementation manner, in a seventh possible implementation manner, the terminal device is a portable terminal device.

With reference to the first possible or second possible implementation manner, in an eighth possible implementation manner, the screen is a liquid crystal display (LCD).

In the embodiments of the present disclosure, the first camera is disposed on the movable component of the movement mechanism, and the movement mechanism is disposed on the back of the screen. Therefore, the first camera does not occupy space on the periphery of a front surface of the screen. When the first camera is required to work, the movable component of the movement mechanism may be operated to drive the first camera to move from the back of the screen to the position at which the first camera can be seen from in front of the terminal device, so that the first camera performs shooting; a ratio of the screen to the entire terminal device is not limited by space occupied by the camera, and a screen-to-body ratio can be maximized.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and a person of ordinary skill in the art may still derive other drawings from these accompanying drawings without creative efforts.

DETAILED DESCRIPTION

To enable a person skilled in the art to better understand the solutions in the embodiments of the present disclosure, the following describes the embodiments of the present disclosure in more detail with reference to accompanying drawings and implementation manners. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
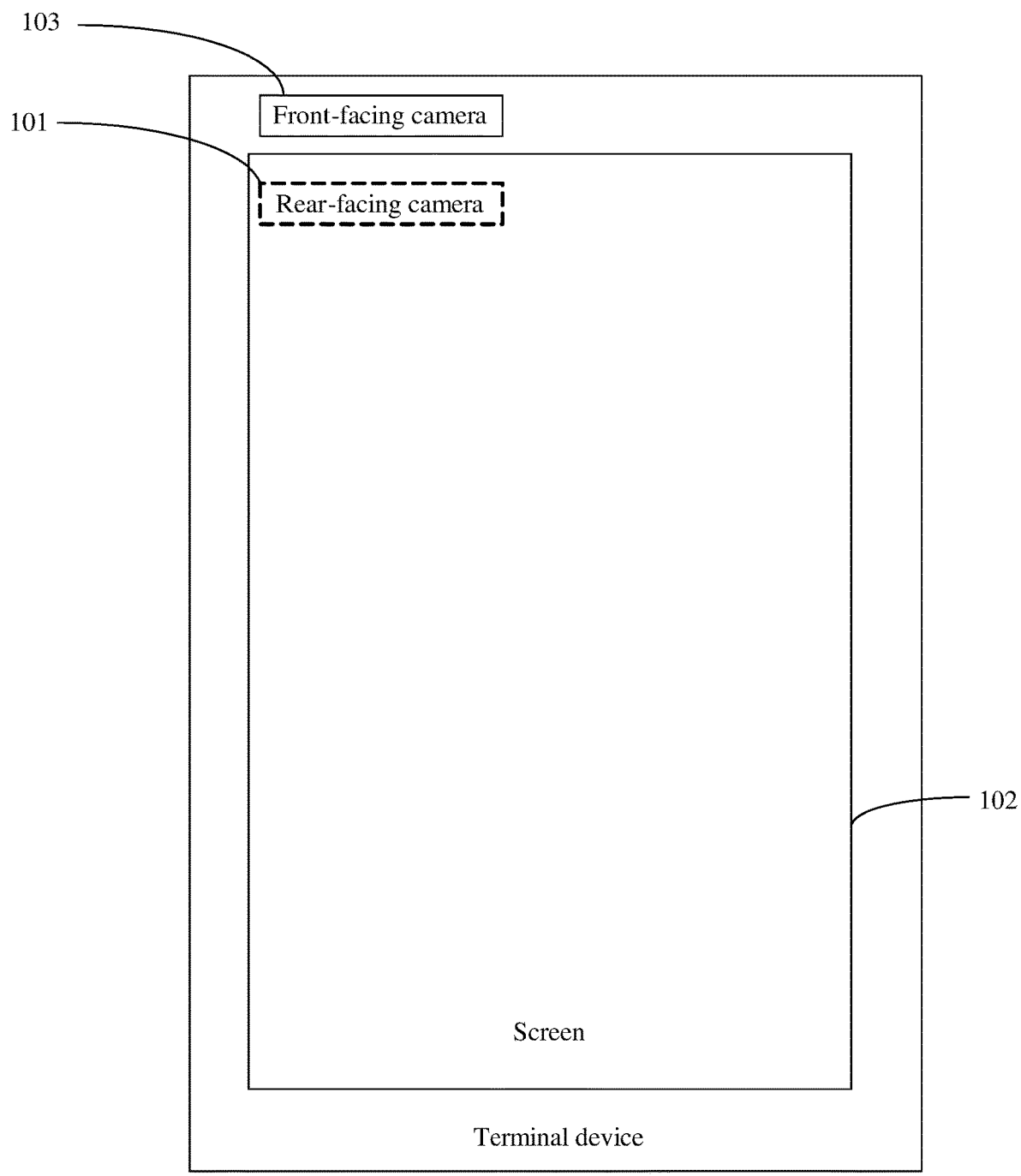
FIG. 1 is a schematic structural diagram of a terminal device in the prior art.
Figure 2:
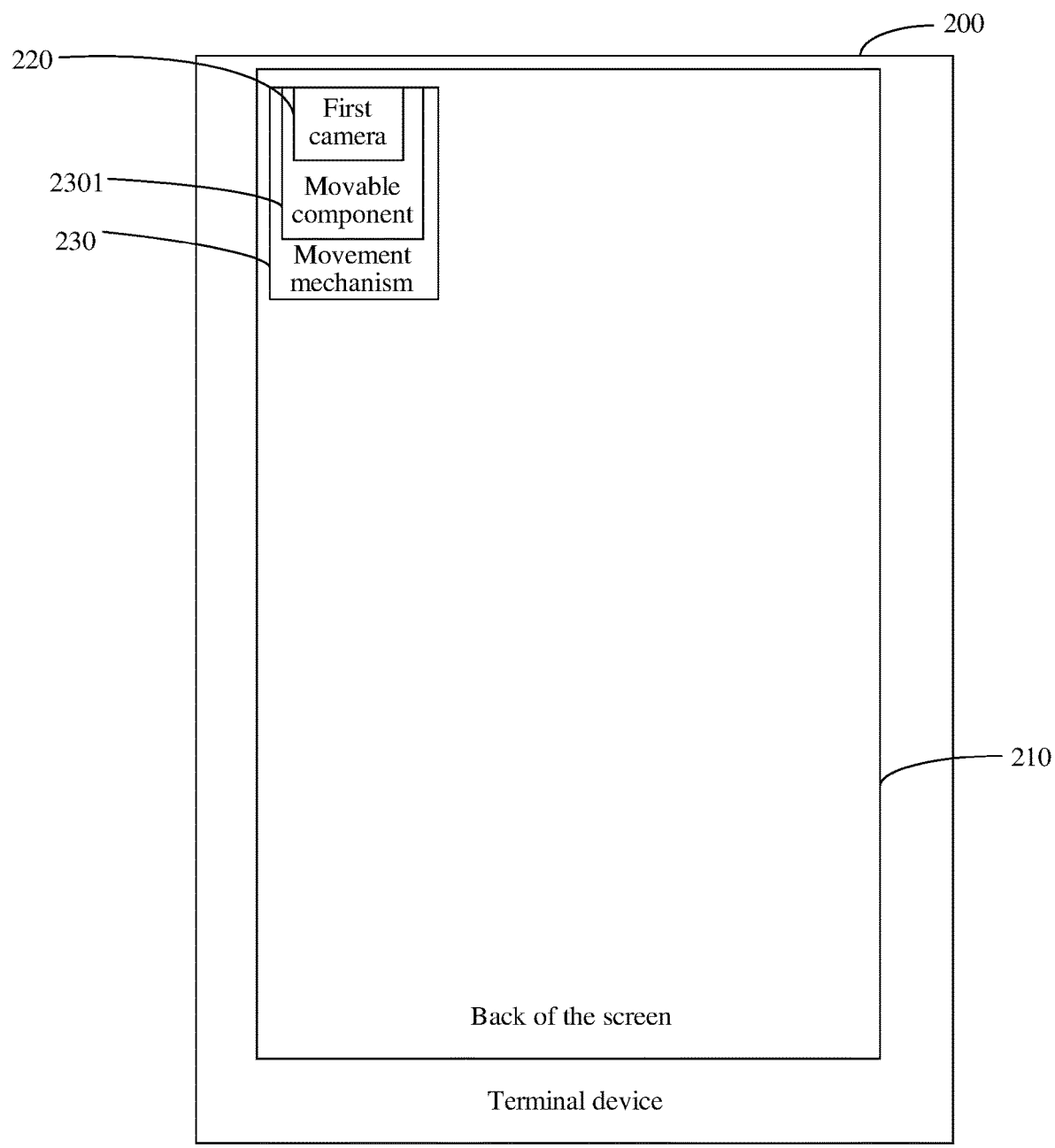
FIG. 2 is a schematic structural diagram of a terminal device according to an embodiment of the present disclosure.
Figure 3:
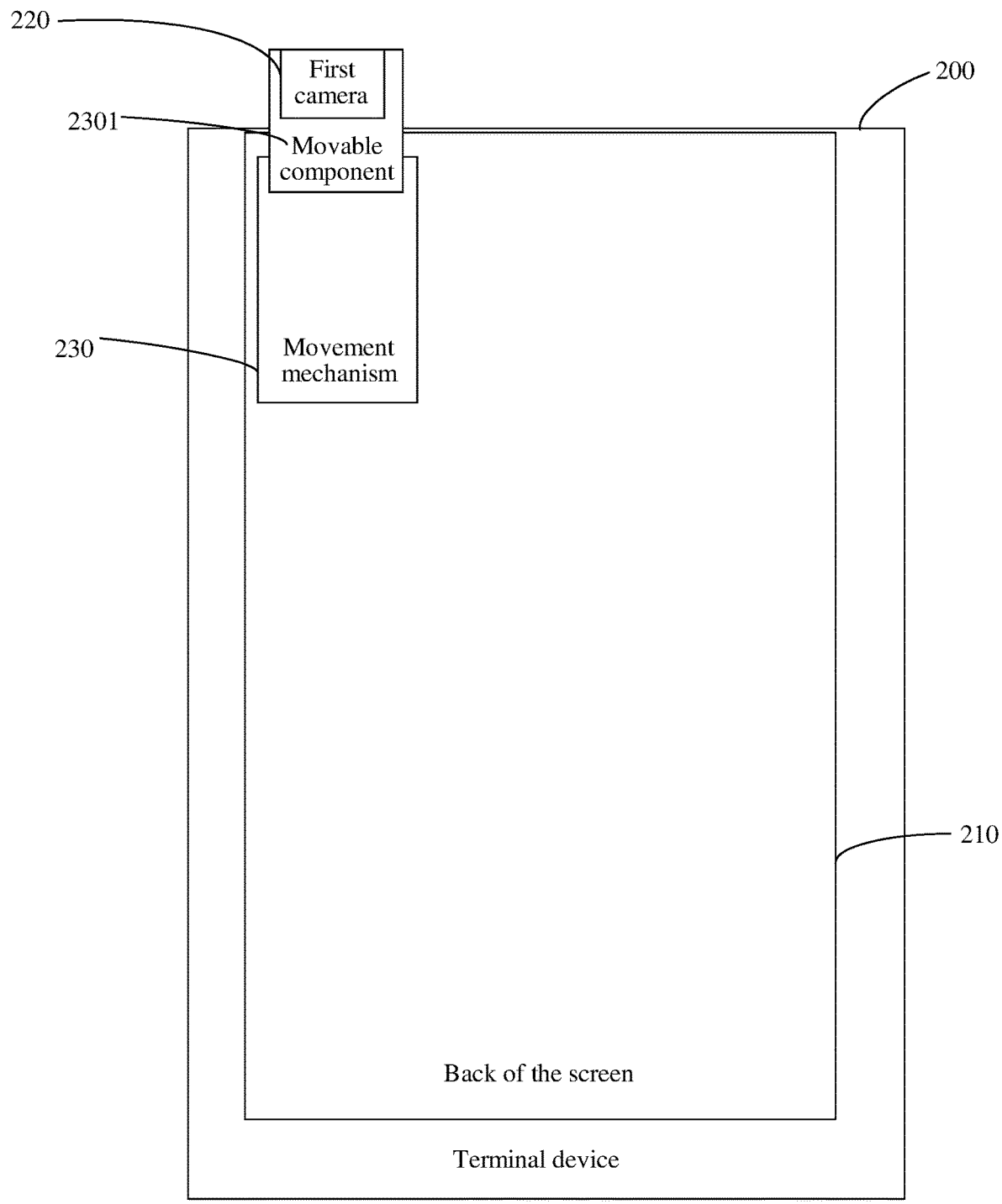
FIG. 3 is another schematic structural diagram of a terminal device according to an embodiment of the present disclosure.

For example, FIG. 2 is one of several schematic structural diagrams of a terminal device according to an embodiment of the present disclosure. As shown in the figure, the terminal device 200 may include a screen 210, a first camera 220, and a movement mechanism 230. The first camera 220 is disposed on a movable component 2301 of the movement mechanism 230; the movement mechanism 230 is disposed on the back of the screen 210; the movable component 2301 is configured to drive the first camera 220 to move from the back of the screen 210 to a position at which the first camera 220 can be seen from in front of the terminal device. For example, after the first camera 220 shown in FIG. 2 is moved, the first camera 220 may be moved to the top of the terminal device 200 shown in FIG. 3. Alternatively, the first camera 200 may be moved to the bottom of the terminal device 200 or be moved out of a side edge of the terminal device 200.

In this embodiment of the present disclosure, the first camera 220 is disposed on the movable component 2301 of the movement mechanism 230, and the movement mechanism 230 is disposed on the back of the screen 210. Therefore, the first camera 220 does not occupy any space outside the display screen 210 on a front surface of the terminal device. When the first camera 220 is required to work, for example, when the first camera is required to shoot a photograph or a video of a target in front of the terminal device, the movable component 2301 of the movement mechanism 230 may be operated to drive the first camera 220 to move from the back of the screen 210 to the position at which the first camera can be seen from in front of the terminal device, so that the first camera performs shooting. A ratio of the screen to the entire terminal device is not limited by space occupied by the camera, and a screen-to-body ratio can be maximized.

Figure 4:
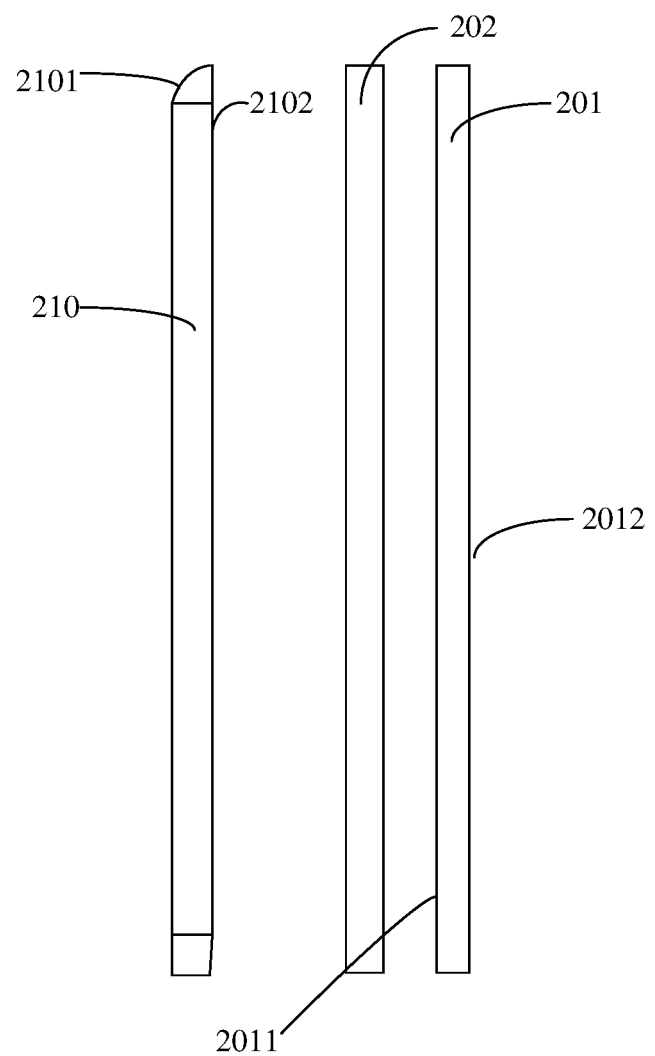
FIG. 4 is a side exploded schematic structural diagram of a terminal device according to an embodiment of the present disclosure.

In the following, a position at which the movement mechanism is disposed is described in detail with reference to one possible side exploded schematic structural diagram of the terminal device 200. For example, refer to FIG. 4, which is a side exploded schematic structural diagram of the terminal device. As shown in FIG. 4, the terminal device may include a front cover 2101 in which the screen 210 is embedded, a rear cover 201, and any component 202 stacked between the screen 210 and the rear cover 201. The movement mechanism, in which the first camera is disposed, may be disposed on a rear surface 2102 of the screen 210, or may be disposed on any component 202 stacked between a rear surface 2102 of the screen and the rear cover 201 of the terminal device, or may be disposed on the rear cover 201 that is located on the back of the screen 210. For example, the movement mechanism may be disposed on an inner surface 2011 of the rear cover or on an outer surface 2012 of the rear cover.

Figure 6:
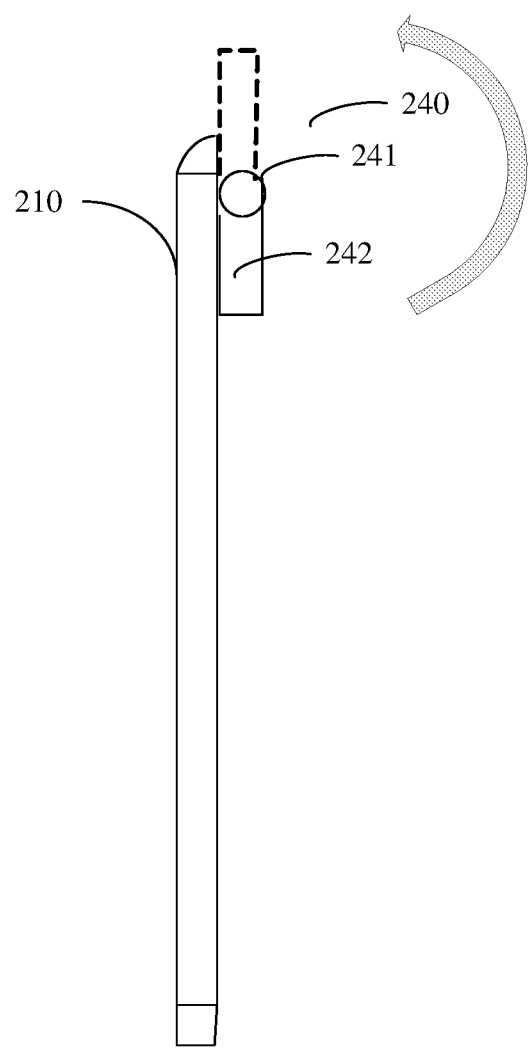
FIG. 6 is a schematic structural diagram of a terminal device with a rotating mechanism according to an embodiment of the present disclosure.

It should be noted that when the first camera 220 is disposed on the back of the screen 210, a lens of the first camera 220 may face a same direction as the front surface of the terminal device 200 or may face a same direction as the back of the terminal device 200. As shown in FIG. 6, in a process that the first camera moves from the back of the screen to the position at which the first camera can be seen from in front of the terminal device, the orientation of the lens of the first camera may be changed by means of the movement. Alternatively, it is also feasible that after the first camera 220 moves to the position at which the first camera 220 can be seen from in front of the terminal device 200, the first camera 220 is made to rotate relative to the screen 210 based on a rotating shaft on the movement mechanism until the lens faces towards a shooting target, to facilitate shooting. A specific implementation manner for rotating the first camera 220 relative to the screen 210 is not limited. For example, the first camera may rotate by means of the rotating shaft between the first camera 220 and the movable component 2301, or the first camera 220 and the movable component 2301 may rotate together relative to the rotating shaft.

Figure 5:
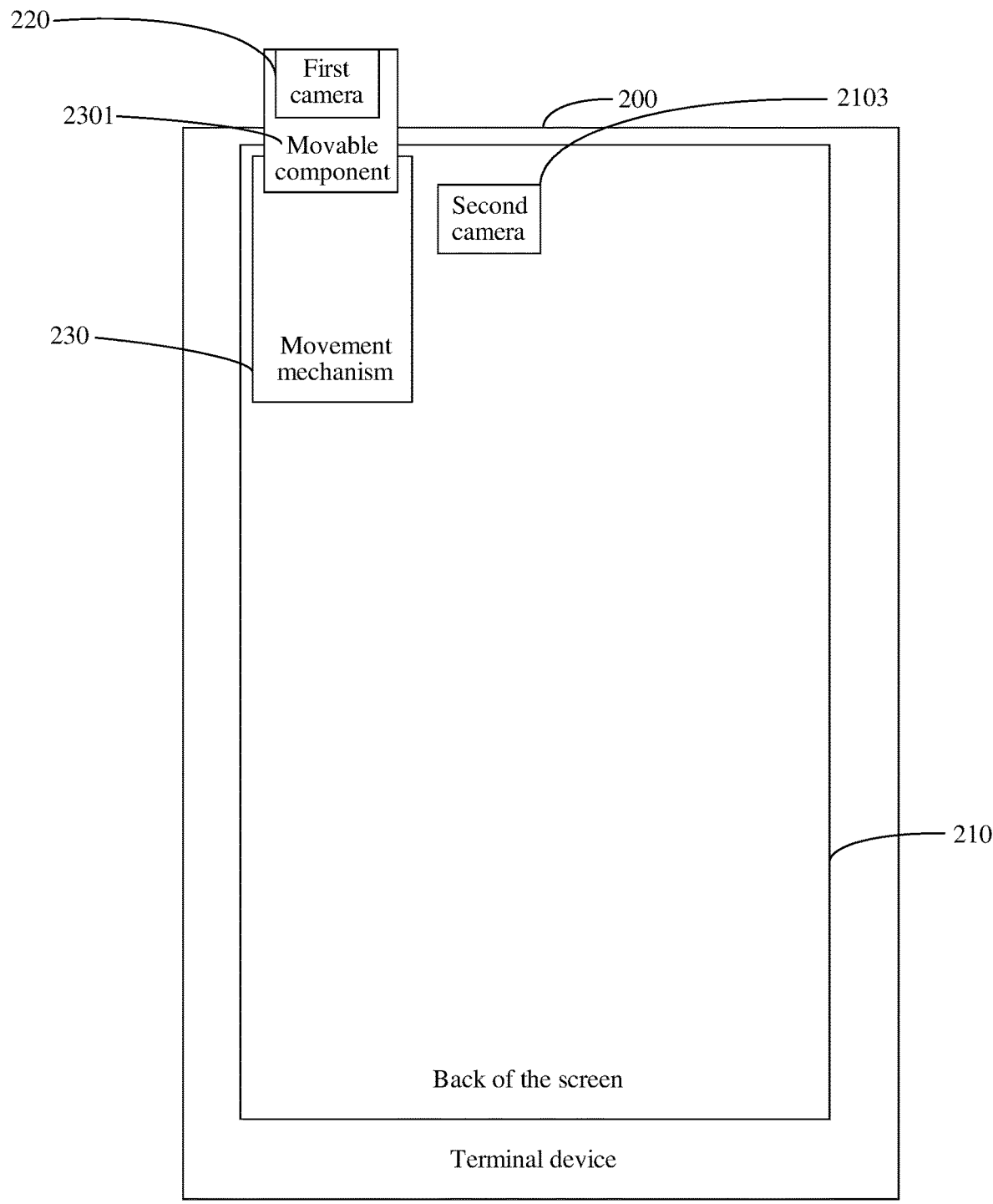
FIG. 5 is still another schematic structural diagram of a terminal device according to an embodiment of the present disclosure.

In some possible implementation manners, as shown in FIG. 5, the terminal device 200 may further include a second camera 2103 disposed on the back of the screen 210. The second camera 2103 may be disposed at any position on the back of the screen 210. For example, the second camera 2103 may be disposed on the back of the screen 210 and located in a housing of the terminal device 200. For example, as shown in FIG. 4, the housing of the terminal device 200 may include the front cover in which the screen is embedded, and the rear cover. In this case, the second camera 2103 may be disposed on the rear surface 2102 of the screen 210 shown in FIG. 4, or may be disposed on any component 202 stacked between the rear surface 2102 of the screen 210 and the rear cover 201 of the terminal device. For another example, the second camera 2103 may be disposed on the housing of the terminal device 200. For example, the second camera 2103 may be disposed on the rear cover 201 of the terminal device shown in FIG. 4. It should be noted that if the second camera is disposed in the housing of the terminal device, a position, aligned with a lens of the second camera, on the rear cover of the terminal device may be of a transparent material, to facilitate shooting.

In some possible implementation manners, for example, after moving to the position at which the first camera can be seen from in front of the terminal device, the first camera 220 may become a front-facing camera whose lens shoots a photograph or a video of a target in front of the terminal device, and the second camera 2103 may be a rear-facing camera whose lens shoots a photograph or a video of a target in rear of the terminal device.

In some possible implementation manners, the movable component 2301 may be further configured to drive the first camera 220 to move from the position at which the first camera can be seen from in front of the terminal device back to the back of the screen 210. For example, if the movement mechanism 230 is a sliding mechanism, a user may operate a movable component a sliding block, of the sliding mechanism to slide from the back of the screen to the top, the bottom, or a side edge of the terminal device along a chute, until the sliding block drives the first camera to slide out of the top, the bottom, or the side edge of the terminal device. After shooting is completed by using the first camera, the sliding block of the sliding mechanism may be operated again to drive the first camera to slide from outside the top, the bottom, or the side edge of screen back to the back of the screen along the chute.

It should be noted that a movement manner and components of the movement mechanism 230 in this embodiment of the present disclosure may be set according to actual implementation requirements, and are not limited in the present disclosure. For example, the movement mechanism 230 may be a rotating mechanism, a sliding mechanism, a popup mechanism, or a transmission mechanism.

For example, the movement mechanism 230 may be a rotating mechanism 240 in a side schematic diagram of a terminal device shown in FIG. 6. The rotating mechanism 240 includes a rotating shaft 241, and a rotating component 242 capable of vertically rotating, on the back of the screen 210, around the rotating shaft 241. The rotating component 242 may be a movable component in the rotating mechanism 240. As shown by the arrow in FIG. 6, the rotating component 242 may vertically rotate along the rotating shaft 241 from the back of the screen 210 towards the top by 180 degrees, to reach the top of the screen 210 (where the rotating component 242 reaching the top is drawn with a dashed line in FIG. 6). For example, in this implementation manner, when the first camera is on the back of the screen, the lens may face a same direction as the back of the terminal device and may be used as a rear-facing camera; after the rotating component, which carries the first camera, rotates by 180 degrees towards the top to reach the top of the screen, the lens naturally turns to face a same direction as the front surface of the terminal device and may be used as a front-facing camera. This implementation manner not only implements a large screen-to-body ratio but also uses one less camera compared with the prior art and reduces overall costs.

Figure 7:
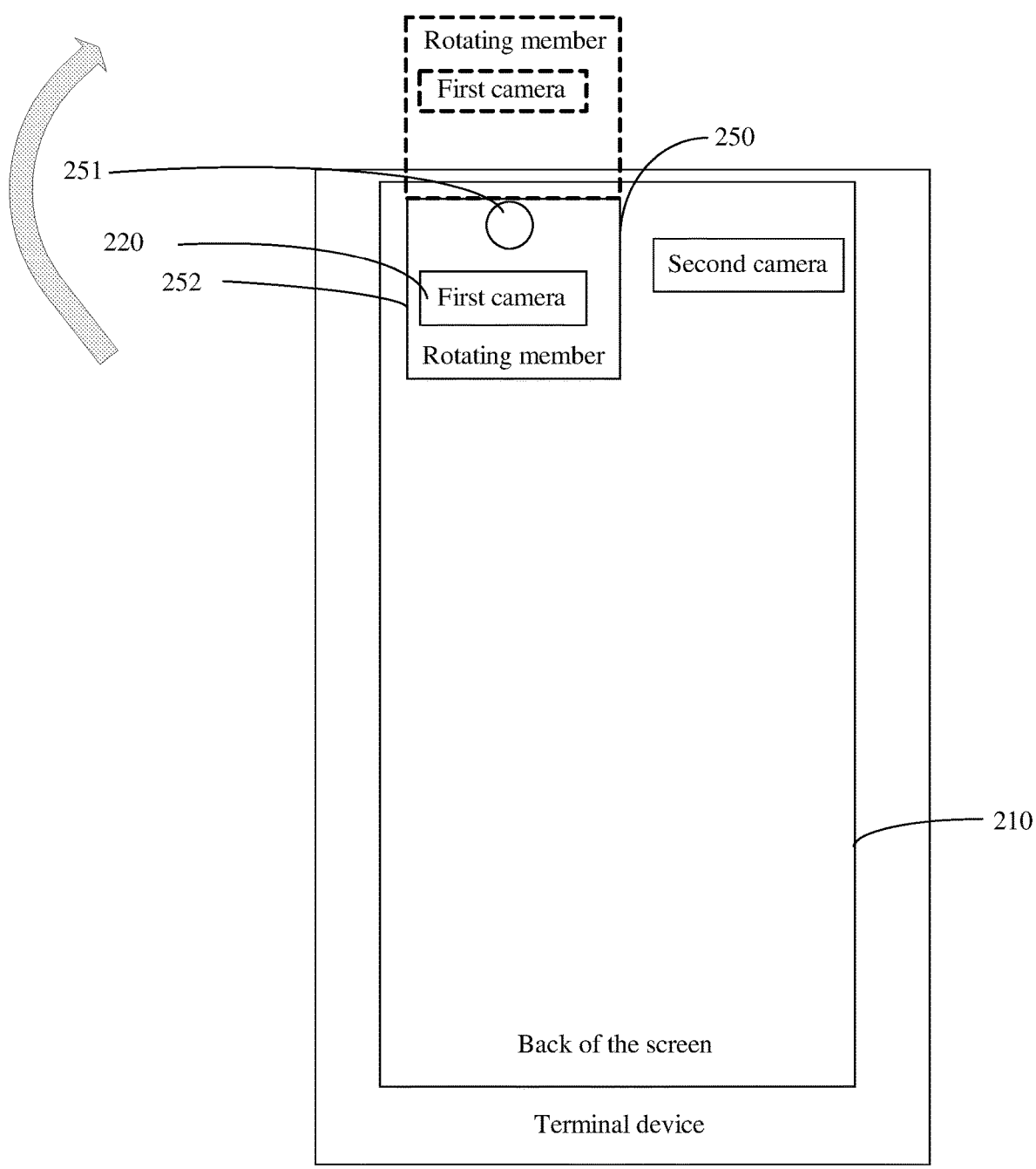
FIG. 7 is a schematic structural diagram of another terminal device with a rotating mechanism according to an embodiment of the present disclosure.

For another example, the movement mechanism 230 may be a rotating mechanism 250 shown in FIG. 7 and includes a rotating shaft 251, and a rotating component 252 capable of rotating upwards, in a plane parallel to the screen 210, around the rotating shaft 251. As shown by the arrow in FIG. 7, the rotating component 252 may rotate upwards, in the plane parallel to the screen 210, along the rotating shaft 252 from the left or right side of the back of the screen 210 by 180 degrees, to reach the top of the screen 210 (where the rotating component 252 reaching the top is drawn with a dashed line in FIG. 7). In this implementation manner, the lens of the first camera 220 may always face a same direction as the front surface of the terminal device, and may be used as a front-facing camera after reaching the top of the screen 210. In this implementation manner, a second camera whose lens faces a same direction as the back of the terminal device may be disposed on the back of the screen and is used as a rear-facing camera.

Figure 8:
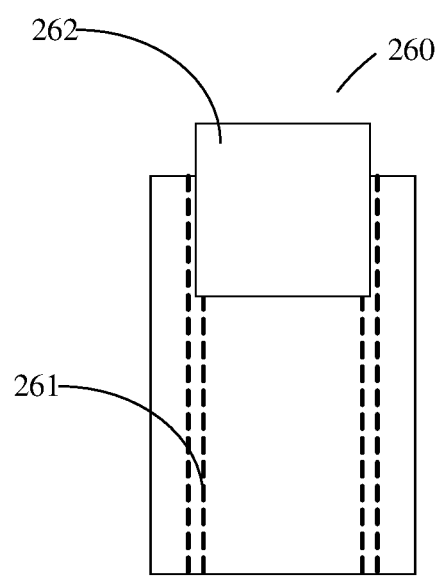
FIG. 8 is a schematic structural diagram of a sliding mechanism in a terminal device according to an embodiment of the present disclosure.

For still another example, the movement mechanism 230 may be a sliding mechanism 260 shown in FIG. 8. A sliding block 262 may be a movable component in the sliding mechanism 260. As shown in FIG. 8, the sliding mechanism 260 may include a chute 261 and the sliding block 262. The chute 261 may be disposed on the back of the screen, and the first camera may be disposed on the sliding block 262. For example, the first camera may be disposed in the sliding block 262. If the first camera is disposed in the sliding block 262 in an enclosed manner, a position, aligned with the lens of the first camera, on a housing of the sliding block 262 may be of a transparent material, to facilitate shooting. Alternatively, the lens of the first camera may be exposed from a surface of the housing of the sliding block 262 to facilitate shooting.

Figure 9:
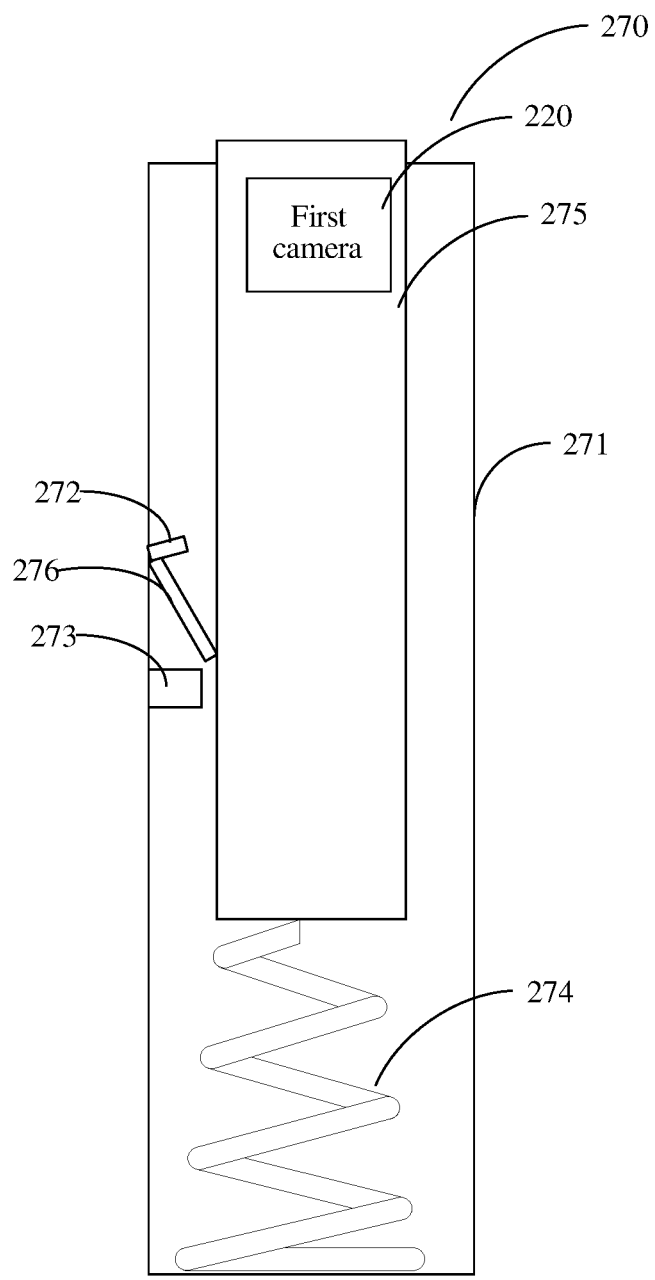
FIG. 9 is a schematic structural diagram of a popup mechanism in a terminal device according to an embodiment of the present disclosure.

For another example, the movement mechanism 230 may be a popup mechanism 270 shown in FIG. 9. An elastic component 274 is a movable component in the popup mechanism 270. The popup mechanism 270 may include a rack 271, a locking component 272, an unlocking component 273, the elastic component 274, a container 275 configured to place the first camera, and a push rod 276. One end of the elastic component 274 is fastened to the bottom of the rack 271, and the other end of the elastic component 274 is connected to the bottom of the container 275, where the bottom of the push rod 276 is connected to a shell of the container 275; as a top end of the push rod 276 moves, an angle formed between the push rod 276 and the shell of the container 275 may change but cannot exceed a set maximum angle. As shown in FIG. 9, when the container 275 is pressed and the push rod 276 and the container 275 are enabled to form a maximum angle that can be formed, an upper end of the push rod 276 abuts against the locking component 272, so that the container 275 configured to place the first camera is locked by the locking component 272. When the container 275 in a locked state continues being pressed, the unlocking component 273 pushes the push rod 276 so that the upper end of the push rod 276 approaches the container 275. The upper end of the push rod 276 moves along a slope of the locking component 272. When the upper end of the push rod 276 moves to be separated from contact with the locking component 272, the elastic component 274 drives the container 275 configured to place the first camera to pop up.

Figure 10:
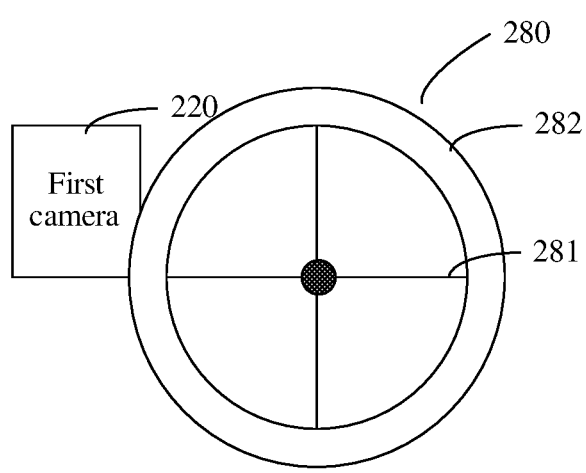
FIG. 10 is a schematic structural diagram of a transmission mechanism in a terminal device according to an embodiment of the present disclosure.

For still another example, the movement mechanism 230 may be a transmission mechanism 280 shown in FIG. 10. The transmission mechanism 280 may include a driving component 281 and a driven component 282. The driven component 282 is a movable component on which the first camera 220 is disposed. For example, as shown in FIG. 10, the driving component 281 may drive the driven component 282 to move. The transmission mechanism 280 may be disposed on the back of the screen 210. When the driven component 282 moves with moving of the driving component 281, the first camera 220 is moved, by means of transmission of the driven component 282, to the position at which the first camera can be seen from in front of the terminal device.

It should be noted that the rotating mechanism, the sliding mechanism, the popup mechanism, and the transmission mechanism shown in FIG. 6 to FIG. 10 are only some possible implementation manners in this embodiment of the present disclosure. A specific structure of the movement mechanism in this embodiment of the present disclosure may be set according to actual implementation requirements, and is not limited in the present disclosure.

In some possible implementation manners, the terminal device 200 in the embodiments of the present disclosure may be a portable terminal device. For example, the terminal device 200 may be a mobile phone, a notebook computer, or a tablet computer.

It should be noted that the screen 210 in the embodiments of the present disclosure may be a display based on various technologies, which is not limited in the present disclosure.

For example, in some possible implementation manners, the screen 210 in this embodiment of the present disclosure may be an LCD.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly. For related parts, reference may be made to partial descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

In short, the foregoing descriptions are merely exemplary embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A mobile phone, comprising:
a screen;
a housing configured to accommodate the screen and a first camera, wherein the housing comprises a rear cover behind a back of the screen; and
a space within the housing between the screen and the rear cover,
wherein when the first camera is in a first position, the first camera is retracted into the space and is between the screen and the rear cover,
wherein an orthogonal projection of the first camera onto a plane of the screen lies at least partially within the screen,
wherein the first camera does not extend from any surface of the rear cover,
wherein the rear cover has no convex part for the first camera,
wherein the first camera is extended from the space and is viewable from in front of the mobile phone as a forward-facing camera when the first camera is in a second position,
wherein the space has an opening on a top of the housing,
wherein the first camera is retracted into the space or extended from the space through the opening,
wherein a height of an extended part of the first camera is larger than a distance between a top edge of the screen and a top edge of the housing when the first camera is in the second position;
wherein the top edge of the screen is an edge of the screen nearest the opening, and
wherein the top edge of the housing is an edge of the housing nearest the opening.

2. The mobile phone of claim 1, further comprising a driving component and a driven component, wherein the first camera is disposed on the driven component, wherein the driving component is configured to drive the driven component to move, and wherein the driven component moves with the first camera to move the first camera between the first position and the second position.

3. The mobile phone of claim 2, wherein the first camera moves perpendicular to the opening.

4. The mobile phone of claim 2, wherein the first camera does not occupy any space on a front surface of mobile phone.

5. The mobile phone of claim 2, wherein a ratio of the screen to a front surface of mobile phone is not limited by space occupied by the first camera.

6. The mobile phone of claim 2, wherein the first camera moves from the first position to the second position when the first camera is in use.

7. The mobile phone of claim 2, wherein the first camera moves from the second position to the first position when the first camera is not in use.

8. The mobile phone of claim 2, wherein the first camera faces a same direction as a front surface of the mobile phone when the first camera is in the first position.

9. The mobile phone of claim 2, further comprising a second camera disposed behind the screen, wherein the second camera is a rear-facing camera.

10. The mobile phone of claim 1, further comprising a sliding device configured to move the first camera between the first position and the second position.

11. The mobile phone of claim 1, further comprising a rotating device configured to move the first camera between the first position and the second position.

12. The mobile phone of claim 1, further comprising a transmission device configured to move the first camera between the first position and the second position.

13. The mobile phone of claim 1, further comprising a spring device configured to move the first camera between the first position and the second position.

14. The mobile phone of claim 1, wherein the first camera is configured to move between the first position and the second position in a plane that is parallel to the screen.

15. The mobile phone of claim 1, wherein the first camera is configured to move between the first position and the second position in a plane that is perpendicular to the screen.

16. An electronic device, comprising:
a screen;
a first camera coupled to the screen;
a housing configured to accommodate the screen and the first camera, wherein the housing comprises a rear cover behind a back of the screen; and
a space within the housing between the screen and the rear cover,
wherein when the first camera is in a first position, the first camera is retracted into the space and is between the screen and the rear cover,
wherein an orthogonal projection of the first camera onto a plane of the screen lies at least partially within the screen,
wherein the first camera does not extend from any surface of the rear cover,
wherein the rear cover has no convex part for the first camera,
wherein the first camera is extended from the space and is viewable from in front of the electronic device as a forward-facing camera when the first camera is in a second position,
wherein the space has an opening on a top of the housing,
wherein the first camera is retracted into the space or extended from the space through the opening, wherein a height of an extended part of the first camera is larger than a distance between a top edge of the screen and a top edge of the housing when the first camera is in the second position;

wherein the top edge of the screen is an edge of the screen nearest the opening; and wherein the top edge of the housing is an edge of the housing nearest the opening.

17. The electronic device of claim 16, wherein the electronic device comprises a tablet computer.

18. The electronic device of claim 16, wherein the electronic device comprises a notebook computer.

19. The electronic device of claim 16, further comprising a driving component and a driven component, wherein the first camera is disposed on the driven component, wherein the driving component is configured to drive the driven component to move, and wherein the driven component moves with the first camera to move the first camera between the first position and the second position.

20. The electronic device of claim 16, further comprising a rear-facing camera that is in a stationary position on the rear cover.

\* \* \* \* \*